US006697244B1

United States Patent
Bauer et al.

(10) Patent No.: US 6,697,244 B1
(45) Date of Patent: Feb. 24, 2004

(54) FAULT-CURRENT PROTECTION DEVICE WITH AN OVERLOAD PROTECTION DEVICE

(75) Inventors: Bernhard Bauer, Regensburg (DE); Manfred Kleemeier, Neutraubling (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/786,631

(22) PCT Filed: Sep. 3, 1999

(86) PCT No.: PCT/DE99/02799

§ 371 (c)(1),
(2), (4) Date: Mar. 7, 2001

(87) PCT Pub. No.: WO00/16459

PCT Pub. Date: Mar. 23, 2000

(30) Foreign Application Priority Data

Sep. 16, 1998 (DE) .......................... 198 42 470

(51) Int. Cl.[7] ................................ H02H 3/08
(52) U.S. Cl. ..................... 361/93.1; 361/93.6
(58) Field of Search ............... 361/93.1, 93.6, 361/44, 77, 87, 47, 50, 51; 363/95, 98, 132

(56) References Cited

U.S. PATENT DOCUMENTS

| 3,737,726 A | * 6/1973 | Tarchalski | .................... 361/45 |
| 4,228,475 A | * 10/1980 | Sherwood | ..................... 361/47 |
| 6,307,725 B1 | * 10/2001 | Solleder et al. | ............ 361/93.6 |

FOREIGN PATENT DOCUMENTS

| DE | 29 38068 C2 | 10/1987 |
| EP | 0 495 771 A2 | 7/1992 |
| WO | 95/26586 | 10/1995 |

OTHER PUBLICATIONS

Warum Fehlerstrom–Schutzschalter mit netzspannungsunabhangiger Auslosung, no date.

* cited by examiner

*Primary Examiner*—Rajnikant B. Patel
(74) *Attorney, Agent, or Firm*—Morrison & Foerster, LLP

(57) ABSTRACT

A residual current device (1), having a residual current tripping circuit (4) which is independent of the mains voltage and contains a core balance transformer (2), and having overload protection (18) arranged in an overload tripping circuit (10) which is supplied with the mains current, wherein the residual current tripping circuit (4) and the overload tripping circuit (10) contain a common tripping relay (7) for operating a switching mechanism (8) which switches a conductor network (LN).

8 Claims, 1 Drawing Sheet

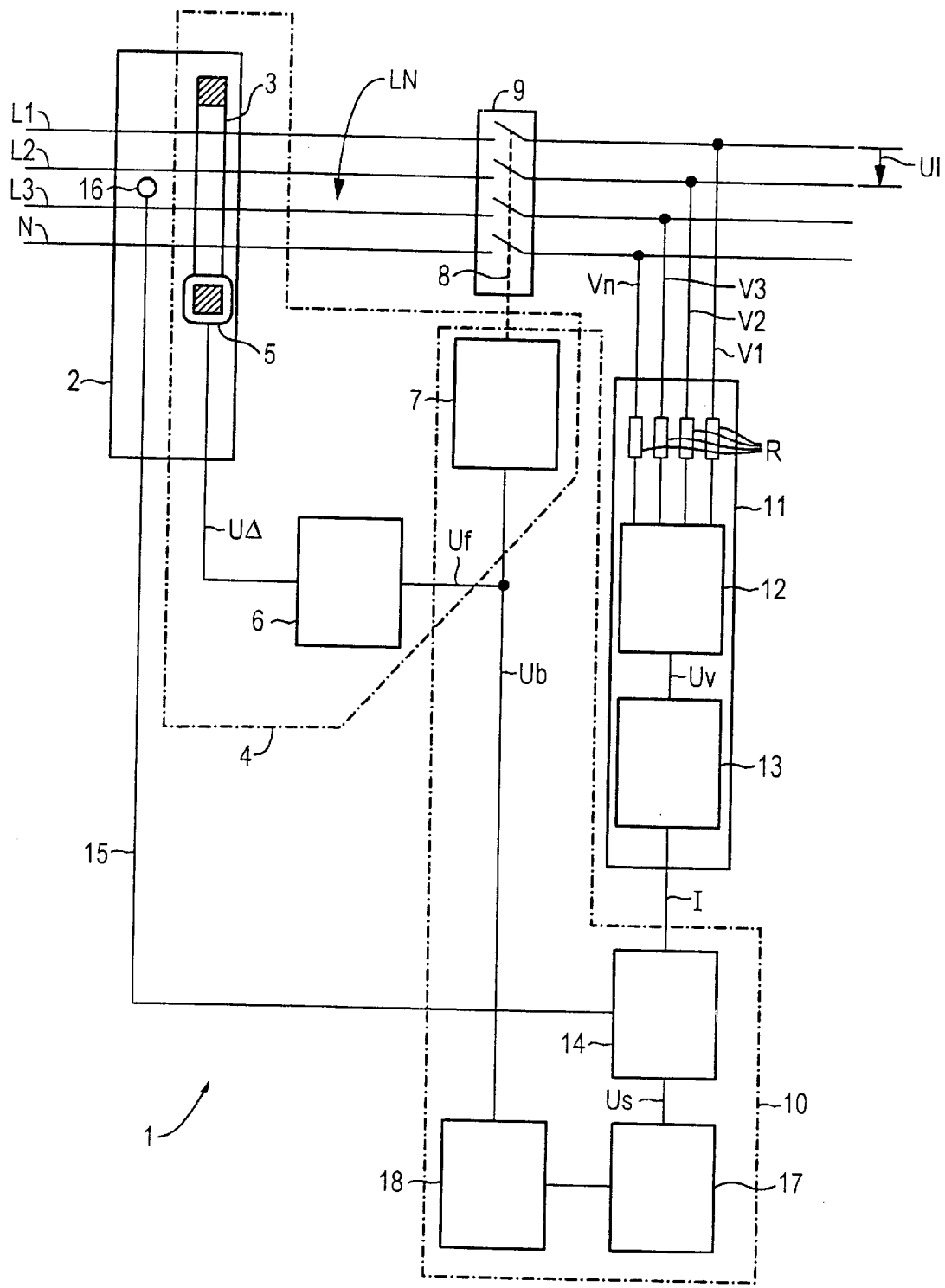

FAULT-CURRENT PROTECTION DEVICE WITH AN OVERLOAD PROTECTION DEVICE

This application claims priority to International Application No. PCT/DE99/02799 which was published in the German language on Mar. 23, 2000.

TECHNICAL FIELD OF INVENTION

The invention relates to a residual current device, and in particular, to a ground leakage current circuit breaker (FI circuit breaker).

BACKGROUND OF THE INVENTION

Residual current devices are used to ensure protection against a dangerous body current in an electrical system. Such a current occurs, for example, when someone touches a live part of an electrical system. The fault current (or differential current) then flows via that person to ground, as a body current. Protective devices, which are used for protection against dangerous body currents, safely and quickly isolate the relevant circuit from the main system when the so-called rated fault current is exceeded.

The design of residual current devices is known, for example, from "etz" (1986), Issue 20, pages 938 to 945. This illustrates, particularly in FIGS. 1 to 3, outline circuit diagrams and functional principles of a ground leakage current circuit breaker (FI circuit breaker) and a differential current circuit breaker (DI circuit breaker). Ground leakage current and differential current circuit breakers are constructed in a similar way from three assemblies. When a fault current occurs, a voltage signal is induced in the secondary winding of a core balance transformer through whose transformer core all the current-carrying conductors of a conductor network are passed. This signal actuates a tripping relay which is connected to the secondary winding via tripping circuit electronics. The tripping relay then operates a switching mechanism, by means of which the conductors of the conductor network are isolated. In this case, the ground leakage current circuit breaker is coupled to the conductor network exclusively and inductively via the core balance transformer. It thus takes the energy required for tripping from the fault current itself, independently of the main voltage. In contrast, in a differential current circuit breaker, tripping is carried out in a manner dependent on the main voltage, by means of an amplifier circuit with a direct electrical connection to the conductor network.

In order to avoid damage if used incorrectly, a residual current device must be protected against thermal overloading. This prevents the residual current device from failing if overloaded, or from itself becoming a source of danger as a consequence of thermal destruction. For example, the Austrian Installation Regulations ÖVE-EN 1, Part 1, Section 12.12 require overload protection for residual current devices. Since only residual current devices which are independent of the main voltage are approved for use in most of the European countries, in accordance with the Standard EN 61008, it is particularly desirable to have overload protection which can be combined with a residual current tripping circuit which is independent of the main voltage.

SUMMARY OF THE INVENTION

The invention relates to refining in a particularly advantageous manner a residual current device having overload protection and having a residual current tripping circuit which is independent of the main voltage.

A residual current tripping circuit which includes a core balance transformer and is independent of the main voltage, and has an overload protection. A tripping circuit is a circuit along which an electrical monitoring variable is produced, and this monitoring variable is assessed, and along which an electrical tripping signal is emitted to a tripping relay when a tripping condition is satisfied.

In one embodiment of the invention, there is a residual current device, including a residual current tripping circuit which is independent of the main voltage and includes a core balance transformer, an overload tripping circuit which is supplied with the main current, wherein the residual current tripping circuit and the overload tripping circuit include a common tripping relay for operating a switching mechanism which switches a conductor network, and a power supply unit connected upstream of the overload tripping circuit and connected via a respective supply line to each conductor of the conductor network, the power supply unit being designed with a high impedance such that each supply line has a resistance of at least about 2.5 k$\Omega$/V-times the magnitude of the main voltage in volts.

In one aspect of the invention, the overload tripping circuit includes an evaluation circuit, which is connected to a temperature sensor and is upstream of a threshold value circuit, for determining a load state.

In another aspect of the invention, the temperature sensor is arranged in the region of the core balance transformer.

In still another aspect of the invention, the temperature sensor is a temperature-dependent non-reactive resistor.

In yet another aspect of the invention, the power supply unit includes a capacitor for storing the energy required to operate the tripping relay.

In another aspect of the invention, the overload tripping circuit is designed with a high impedance such that the current draw of the overload tripping circuit has an upper limit of about 80–90% of the quotient of $1/\sqrt{3}$-times the main voltage and twice the resistance in each supply line where $I \leq$ and $0.8 \leq F \leq 0.9$.

In yet another aspect of the invention, the power supply unit includes a capacitor for storing the energy required to operate the tripping relay.

In still another aspect of the invention, the overload tripping circuit is designed with a high impedance such that the current draw of the overload tripping circuit has an upper limit of about 80–90% of the quotient of $1/\sqrt{3}$-times the mains voltage ($U1/\sqrt{3}$) and twice the resistance in each supply line where $I \leq (F^*U1/\sqrt{3})/(2^*R)$ and $0.8 \leq F \leq 0.9$.

According to this, the overload protection is arranged in an overload tripping circuit which is supplied with the main current. The residual current tripping circuit and the overload tripping circuit contain a common tripping relay, by means of which a switching mechanism which is arranged in the conductor network can be operated both by the residual current tripping circuit and by the overload tripping circuit.

A major advantage of the residual current device is that only the overload protection draws power from the conductor network. In contrast, the residual current tripping circuit is independent of the conductor network. The residual current device is therefore a ground leakage current circuit breaker which is independent of the mains voltage, in the sense of the Standard EN 61008. Since only one, common, tripping relay is provided for both tripping circuits, this results in a space-saving design and low costs.

The overload protection preferably has an upstream power supply unit, which is connected to each conductor of the conductor network in order to supply voltage. This ensures the operation of the overload protection even in the event of partial failure of the conductor network. Designing the power supply unit with a high impedance means that the overload tripping circuit is advantageously protected against high-voltage surges in the conductor network. In this case, each supply line including a resistance which is at least 2.5 kΩ/V-times the magnitude of the voltage, in volts, between any two given conductors of the conductor network. It is particularly advantageous to arrange the temperature sensor in the region of the core balance transformer, in particular in the immediate vicinity of those conductors of the conductor network which pass through the core balance transformer, where the thermal load on the residual current device is particularly high.

In one advantageous refinement, the overload tripping circuit includes a rectification circuit with a downstream capacitor. Owing to the high-impedance link between the overload tripping circuit and the conductor network, the power which can be drawn from the conductor network is not sufficient to trip the tripping relay. The energy required to operate the tripping relay is therefore stored by means of the capacitor within the overload tripping circuit. In order to achieve a particularly low current draw, the overload tripping circuit is designed with a high impedance such that the current draw in the overload tripping circuit satisfies the expression $I \leq (0.8*U1/\sqrt{3})/(2*R)$. In this case, U1 is the mains voltage applied between any two given conductors of the conductor network, and R is the resistance connected in each supply line to the power supply unit. The factor F describes the ratio between the minimum voltage required for the equipment to operate and the lowest rated voltage. Typical values quoted in the Standards are, for example, 0.8; 0.85 or 0.9. In order to satisfy this condition, the components in the overload tripping circuit must have a correspondingly low current draw.

In one advantageous refinement, the overload tripping circuit includes a decoupling circuit which prevents the two tripping circuits from influencing one another. The decoupling circuit may be provided, for example, by a diode.

An exemplary embodiment of the invention will be explained in more detail in the following text, with reference to the drawing. In this case, the single FIGURE shows, schematically, a circuit diagram of a ground leakage current circuit breaker having a residual current tripping circuit which is independent of the mains voltage and an overload tripping circuit which is supplied from the main voltage.

The ground leakage current circuit breaker 1 illustrated in FIG. 1 includes a core balance transformer 2 through which the three phase conductors Li, i=1, 2, 3 and the neutral conductor N of a four conductor network LN are passed. The ground leakage current circuit breaker 1 is in this case connected upstream of an electrical load (not shown), which is supplied with power via the conductor network LN.

The core balance transformer 2 includes a magnetic transformer core 2 which surrounds the phase conductors Li and the neutral conductor N. A secondary coil 5, which is arranged in a residual current tripping circuit 4, is wound around this transformer core 3. During normal operation of the conductor network LN, the sum of the currents flowing through the transformer core 3 is always zero. A fault occurs when—for example as a result of a leakage current—a portion of the current supplied on the load side is carried away via ground. In this case, the sum of the currents flowing through the transformer core 3 has a value other than zero, and this is referred to as the fault current or ground leakage current. This fault current induces a differential voltage ΔU in the secondary coil 5, and this is used as a measure of the fault current which exists. The differential voltage ΔU produced in the secondary coil 5 is supplied to tripping electronics 6 within the residual current tripping circuit 4. If the differential voltage ΔU exceeds a predetermined threshold value, then the tripping electronics 6 emit a tripping voltage Uf to a tripping relay 7. The tripping relay 7 then operates a switching mechanism 8, which opens all the switching contacts of a switch 9 which acts on all the phase conductors Li and the neutral conductor N.

The ground leakage current circuit breaker also includes an overload tripping circuit 10, whose associated power supply unit 11 is connected via corresponding supply lines Vi, Vn to all the phase conductors Li and to the neutral conductor N. These supply lines Vi, Vn connect the corresponding conductors Li, N of the conductor network LN via in each case one resistance R, connected in each supply line Vi, Vn to a rectification circuit 12. Each resistance R is designed with a high impedance such that its value satisfies the equation $R \geq (2.5 \text{ k}\Omega/V)*U1$. U1 in this case denotes the mains voltage which is present between any two given conductors Li, N of the conductor network LN.

Arranging the resistances R in each supply line Vi, Vn means that a series circuit formed by a resistance R with the other three resistances R connected in parallel is always present in the high-voltage test in accordance with the Equipment Standard EN 61008. The resistances R are in this case preferably designed such that they can be loaded in such a way that they pass the cited high-voltage test. In this case, an alternating voltage of up to 2500 V and lasting for one minute is applied between one of the conductors Li, N and the other conductors Li, N which care connected to one another. Furthermore, the high impedance configuration of the resistances R keeps the leakage current, which flows between the conductors Li, N within the rectification circuit 12, particularly low during the high-voltage test. When designed for a 230/400 V mains system, for example, this leakage current is preferably less than 2 mA.

The rectification circuit 12 is followed by a capacitor 13 to which a rectified operating voltage Uv is applied by means of the rectification circuit 12. The capacitor 13 is in turn followed by an evaluation circuit 14 for determining the load state. For this purpose, the evaluation circuit 14 is connected via a measurement line 15, which branches off from the overload tripping circuit 10, to a temperature-dependent resistor (PTC or NTC thermistor) as the temperature sensor 16. The temperature sensor 16 is arranged within the core balance transformer 2, in particular in the region of the conductors Li, N. From experience, a particularly high thermal load occurs at this point during operation of the ground leakage current circuit breaker 1.

The evaluation circuit 14 determines the resistance of the temperature sensor 16 as a measure of the temperature in the core balance transformer 2, and emits a signal voltage Us, which corresponds to this temperature, to a downstream threshold value circuit 17. If the signal voltage Us exceeds a predetermined threshold value, then the threshold value circuit 17 emits a tripping voltage Ub via a decoupling circuit 18 to the tripping relay 7. The energy required for the tripping process is for this purpose provided from the charged capacitor 13. This is particularly necessary since the high-value resistances R restrict the current supply from the conductor network LN.

A decoupling circuit 19 which is connected between the threshold value circuit 17 and the tripping relay 7 prevents the current flow in the residual current tripping circuit 4 from influencing the current flow in the overload tripping circuit 10. The decoupling circuit 19 ensures that the two tripping circuits 4 and 10 are independent, in particular even if they are joined together on a common current path in the region of the tripping relay 7. In order to keep the current draw of the overload circuit 10 low, the evaluation circuit 14 and the threshold value circuit 17 are designed with a high impedance such that the current draw I in the overload tripping circuit 10 does not exceed a value of $(F*U1/\sqrt{3})/(2*R)$. In this case, the factor F describes the ratio between the minimum voltage required for equipment operation and the lowest rated voltage. This factor F is preferably 0.8.

What is claimed is:

1. A residual current device, comprising:

a residual current tripping circuit which is independent of the main voltage and includes a core balance transformer;

an overload tripping circuit which is supplied with the main current, wherein the residual current tripping circuit and the overload tripping circuit include a common tripping relay for operating a switching mechanism which switches a conductor network; and a power supply unit connected upstream of the overload tripping circuit and connected via a respective supply line to each conductor of the conductor network, the power supply unit being designed with a high impedance such that each supply line has a resistance of at least about 2.5 kΩ/V-times the magnitude of the main voltage in volts.

2. The residual current device as claimed in claim 1, wherein the overload tripping circuit comprises an evaluation circuit, which is connected to a temperature sensor. and is upstream of a threshold value circuit, for determining a load state.

3. The residual current device as claimed in claim 2, wherein the temperature sensor is arranged in the region of the core balance transformer.

4. The residual current device as claimed in claim 2, wherein the temperature sensor is a temperature-dependent non-reactive resistor.

5. The residual current device as claimed in claim 1, wherein the power supply unit includes a capacitor for storing the energy required to operate the tripping relay.

6. The residual current device as claimed in claim 5, wherein the overload tripping circuit is designed with a high impedance such that the current draw of the overload tripping circuit has an upper limit of about 80–90% of the quotient of $1/\sqrt{3}$-times the main voltage and twice the resistance in each supply line where the current draw of the overload tripping circuit is less than or equal to F times the main voltage and F is a number between 0.8 and 0.9.

7. The residual current device as claimed in claim 1, wherein the power supply unit includes a capacitor for storing the energy required to operate the tripping relay.

8. The residual current device as claimed in claim 7, wherein the overload tripping circuit (I) is designed with a high impedance such that the current draw of the overload tripping circuit has an upper limit of about 80–90% of the quotient of $1/\sqrt{3}$-times the mains voltage $(U1/\sqrt{3})$ and twice the resistance in each supply line where $I \leq (F*U1/\sqrt{3})/(2*R)$ and F is a number between 0.8 and 0.9.

* * * * *